US009213559B2

(12) United States Patent
Sun et al.

(10) Patent No.: US 9,213,559 B2
(45) Date of Patent: Dec. 15, 2015

(54) METHOD AND DEVICE FOR PUBLISHING AND IMPLEMENTING WIRELESS APPLICATION

(71) Applicant: Alibaba Group Holding Limited, George Town (KY)

(72) Inventors: Chongbo Sun, Hangzhou (CN); Gongping Chen, Hangzhou (CN); Weigang Guan, Hangzhou (CN)

(73) Assignee: Alibaba Group Holding Limited (KY)

( * ) Notice: Subject to any disclaimer, the term of this patent is extended or adjusted under 35 U.S.C. 154(b) by 83 days.

(21) Appl. No.: 13/911,957

(22) Filed: Jun. 6, 2013

(65) Prior Publication Data

US 2013/0332943 A1  Dec. 12, 2013

(30) Foreign Application Priority Data

Jun. 8, 2012  (CN) .......................... 2012 1 0189767

(51) Int. Cl.
*G06F 3/00* (2006.01)
*G06F 9/44* (2006.01)
*G06F 9/46* (2006.01)
*G06F 13/00* (2006.01)
*G06F 9/445* (2006.01)
*G06F 9/54* (2006.01)

(52) U.S. Cl.
CPC .............. *G06F 9/44521* (2013.01); *G06F 8/67* (2013.01); *G06F 9/541* (2013.01)

(58) Field of Classification Search
CPC ........ G06F 9/44521; G06F 9/541; G06F 8/67
USPC .......................................................... 719/331
See application file for complete search history.

(56) References Cited

U.S. PATENT DOCUMENTS

| 7,536,679 B1 * | 5/2009 | O'Connell et al. ........... 717/126 |
| 7,802,230 B1 | 9/2010 | Mendicino et al. |
| 8,271,031 B2 | 9/2012 | Boskovic |
| 8,352,949 B1 | 1/2013 | Kunath et al. |
| 2009/0217310 A1 * | 8/2009 | Koretz .......................... 719/328 |
| 2009/0300199 A1 | 12/2009 | Burns et al. |
| 2010/0107139 A1 | 4/2010 | Bireley et al. |
| 2011/0010724 A1 | 1/2011 | Thokur Lakshminarayanan et al. |
| 2012/0233103 A1 | 9/2012 | Ashrafi et al. |

* cited by examiner

*Primary Examiner* — Timothy A Mudrick
(74) *Attorney, Agent, or Firm* — Van Pelt, Yi & James LLP

(57) ABSTRACT

Embodiments of the present application relate to a method of publishing a wireless application, a method of implementing a wireless application, a device for publishing a wireless application, a device for implementing a wireless application, and a computer program product for publishing a wireless application. A method of publishing a wireless application is provided. The method includes integrating a permanent interface layer of a software development kit (SDK) into a wireless application, publishing the integrated wireless application, and installing the dynamic implementation layer of the SDK onto a server. The SDK includes the permanent interface layer and a dynamic implementation layer, the permanent interface layer including an interface protocol to be invoked by the wireless application and the dynamic implementation layer including an interface implementation corresponding to the interface protocol.

9 Claims, 11 Drawing Sheets

100

400

500

800

900

METHOD AND DEVICE FOR PUBLISHING AND IMPLEMENTING WIRELESS APPLICATION

CROSS REFERENCE TO OTHER APPLICATIONS

This application claims priority to People's Republic of China Patent Application No. 201210189767.4 entitled METHOD AND DEVICE FOR PUBLISHING AND IMPLEMENTING WIRELESS APPLICATIONS, filed Jun. 8, 2012 which is incorporated herein by reference for all purposes.

FIELD OF THE INVENTION

The present application relates to a method and a device for publishing and implementing a wireless application.

BACKGROUND OF THE INVENTION

"Wireless applications" typically refer to wireless client applications developed from terminal-based operating systems. Wireless applications typically are integrated with SDKs (Software Development Kits) that implement specific functions. An example of an SDK is an advertising SDK, in other words, a software development kit is used by a wireless application developer to integrate advertising logic. Companies engaged in the business of placing wireless advertisements typically provide such SDKs on their websites to wireless application developers.

The SDKs may use different modes of placement to address differences in wireless application integration. For example, in a wireless application advertising SDK system, currently two kinds of advertising platforms exist on the market. One kind of advertising platform is an advertising resources platform for companies that place their own advertisements, in other words, companies that wish to advertise. An example of the one kind of advertising platform is ADMob. Another kind of advertising platform is a platform that provides advertising optimization services with an SDK that integrates a plurality of advertising platforms. An example of the other kind of advertising platform is mogo (www.adsmogo.com). Thus, the advertising platform optimizes wireless application (App) advertisement global fill rates and improves the accuracy of targeted advertising. The former advertising platform requires that the developer integrates an SDK of the advertising platform into a wireless application of the developer. Whenever a new version of the SDK of the former advertising platform is published, the wireless application developer need to integrate the new version of the SDK, revise the code, and republish the wireless application, requiring users to update the corresponding wireless application. Regarding the latter advertising platform, if any of the integrated advertising platform SDKs is upgraded, the SDK is confronted with a new demand for updating. Moreover, in order for the wireless application developer to add a new SDK or remove an integrated SDK, the developer is required to develop and publish a new application.

Regarding platforms with SDKs that integrate a plurality of advertising platforms, after the wireless application developer completes the development of a wireless application, often a long period of time passes without the developer having to re-develop or perform upgrade maintenance. However, an advertising platform with an integrated SDK might, as a result of a version upgrade of the existing wireless application, become incompatible with older versions of the existing wireless application. In this case, the existing wireless application must be upgraded. From the point of view of the wireless application end user, the end user has no need to update the wireless application. For wireless application developers, the need for the end user to update the application and the need to upgrade the application simply add extra development and maintenance work as well as application publishing costs.

In order to fully use advertising resources and raise global fill rates, advertising platforms generally use a plurality of integrated advertising SDKs. The use of advertising platforms that integrate advertising SDKs seeks to avoid the problem of insufficient resources (which leads to low fill rates and wasted resources) for advertisement targeting firms and advertisers that result from wireless applications integrating too few advertising SDKs. However, for platforms integrating advertising SDKs, advertising SDK upgrades can result in large increases in workload relating to wireless application upgrades, packaging, and publication.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application relates to the execution of a wireless application. The wireless application dynamically acquires a latest version of an integrated class library of a software development kit from a server and loads and executes the latest version. By dynamically loading class libraries, wireless applications that are currently integrated with SDKs obtain new functions.

Figure 11:
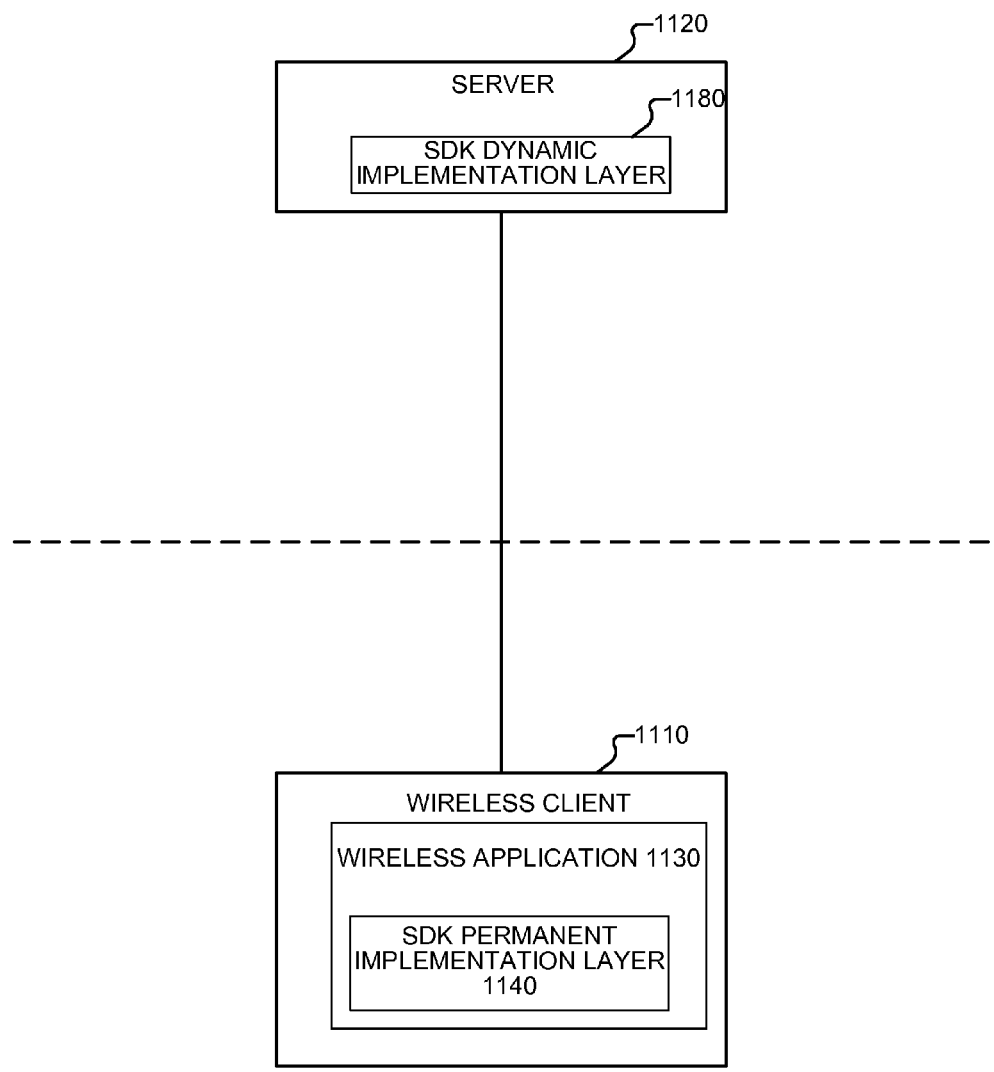
FIG. 11 is a diagram of an SDK dynamic implementation layer being loaded into a wireless application.

FIG. 11 is a diagram of an SDK dynamic implementation layer being loaded into a wireless application. A wireless client 1110 corresponds to a wireless client 910 of FIG. 9 and includes a wireless application 1130. The wireless application 1130 includes an SDK permanent interface layer 1140. During execution of the wireless application 1130, the wireless application 1130 invokes an SDK dynamic implementation layer 1180 from a server 1120.

Figure 1:
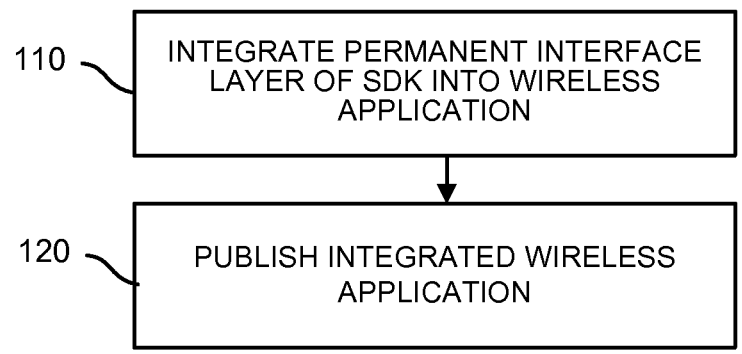
FIG. 1 is a flow chart of an embodiment of a wireless application publishing process.

FIG. 1 is a flow chart of an embodiment of a wireless application publishing process. The process 100 can be implemented by a server 820 of FIG. 8 and comprises:

In 110, the server integrates a permanent interface layer of an SDK into a wireless application. In some embodiments, the integration is done through static linking during the compilation of the wireless application.

This SDK includes the permanent interface layer and a dynamic implementation layer. The permanent interface layer includes an interface protocol. The interface protocol refers to the SDK defined application programming interface. For example, the SDK defines an interface used to obtain the text of an ad as GetTextAds (Point Position, String content, Font fontSize, Color textColor). In some embodiments, the permanent interface layer is invoked by the wireless application via the interface protocol. The dynamic implementation layer includes an interface implementation to be invoked by the wireless application, and the interface implementation corresponds to the interface protocol. The interface protocol in the permanent interface layer causes the wireless application in the wireless client to invoke the interface implementation in the dynamic implementation layer.

The interface protocol is a protocol for the interface. In some embodiments, the interface protocol defines a name of an interface class, a name of a public method, an accepted method invoking parameter types and sequences, and types of return values. In some embodiments, the interface is implemented through a class. The interface implementation is a specific implementation of the interface defined in the interface protocol. In some embodiments, the interface protocol includes method names, parameter types and sequences, return value types, etc. to conform to the interface protocol.

In 120, the server publishes the integrated wireless application and installs the dynamic implementation layer of the SDK.

In some embodiments, the publish and install operations depend on the operating system (OS) of the client terminal. For example, in an Android app, the Android app will package the dynamic implementation layer of the SDK in the application package file (APK).

Published wireless applications are downloadable for wireless clients to use. In some embodiments, while a wireless application is being used or when the wireless application is subsequently updated, the wireless application invokes, through an interface defined by an interface protocol in the permanent interface layer and an interface implementation installed on the dynamic implementation layer of the server.

In this example, an SDK is divided up into the permanent interface layer and the dynamic implementation layer. In some embodiments, the permanent interface layer includes an interface application that can be invoked by a wireless application. In some embodiments, an update does not change the permanent interface layer. As an aspect, the dynamic implementation layer includes an interface implementation corresponding to the interface protocol. In other words, the dynamic implementation layer is to be invoked by the wireless application via the interface implementation. In some embodiments, an update changes the dynamic implementation layer. By dividing up the SDK into two layers, the relatively stable permanent interface layer is integrated into the wireless application for publication. On the other hand, the dynamic implementation layer is invoked by the permanent interface layer of the wireless application used by the wireless client, and a class library for the interface implementation of the dynamic implementation layer is dynamically loaded. In other words, when the dynamic implementation layer is dynamically loaded, a compiled class will be loaded into memory. Because SDK updating is primarily an updating of an interface implementation, in the event that an SDK is to be updated, only the dynamic implementation layer located on the server is updated. The wireless application part of the wireless client does not need to be modified. Thus, when the integrated SDK of a wireless application is being updated, the wireless application itself (in other words, the part other than the SDK) does not need to be updated at the same time. This division of the SDK into two layers greatly reduces the number of situations where the wireless application of a wireless client must be upgraded together with the SDK. Moreover, the division of the SDK into two layers is transparent to wireless application users and enhances the users' experience, and also reduces the development burden on wireless application developers and reduces development and maintenance costs as well as the cost of publishing applications.

Figure 2:
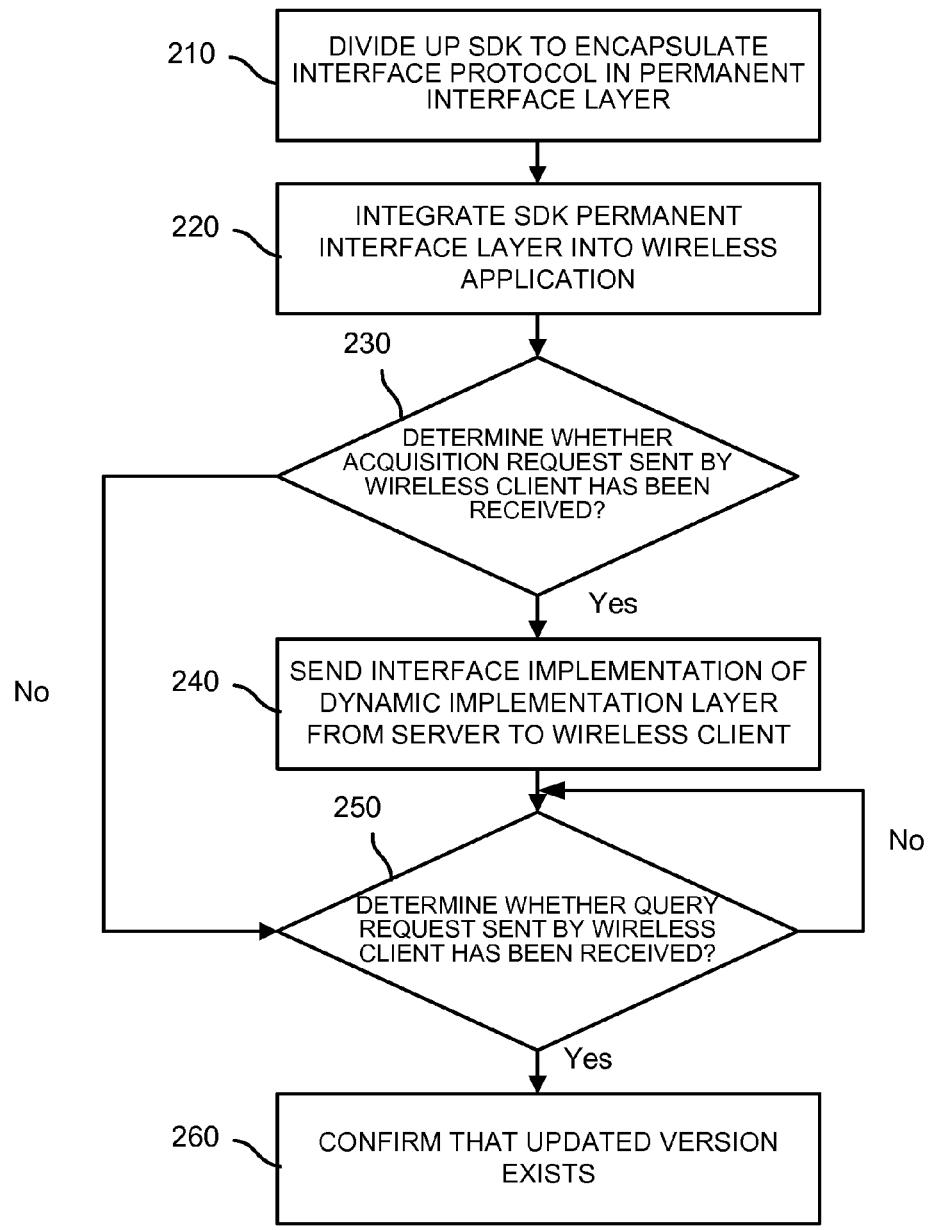
FIG. 2 is a flow chart of another embodiment of a wireless application publishing process.

FIG. 2 is a flow chart of another embodiment of a wireless application publishing process. The process 200 can be implemented by the server 820 of FIG. 8 and comprises:

In 210, the server divides up an SDK to encapsulate an interface protocol in a permanent interface layer and encapsulate an interface implementation in a dynamic implementation layer.

In some embodiments, the SDK is divided during development of the application.

Conventionally, a provider releases an SDK as an entire software package that contains both the interface protocol and the interface implementation or within a single software program. Then, the wireless application developer integrates the entire SDK into a wireless application for publication.

On the other hand, in the present embodiment, the interface protocol is made into a package. In other words, the interface protocol is encapsulated as a permanent interface layer. The permanent interface layer of the SDK is exposed to the call interface protocol of external programs (such as wireless applications) with integrated SDKs. In some embodiments, the package is compiled data and can be directly invoked by an external application. The integrated SDK includes a dynamic implementation layer and a permanent interface layer as two separate layers. The call interface protocol includes the interface definitions, such as method names, return types, accepted parameters, input-output protocols, etc. The interface implementation is made into a separate package. In other words, the interface implementation is encapsulated as a dynamic implementation layer. The interface implementation is compiled code implementing the dynamic implementation layer. The SDK dynamic implementation layer is a specific implementation of the interface defined by the SDK permanent interface layer. The SDK dynamic implementation layer is not perceived by external programs with integrated SDKs. In other words, an external program calls the permanent interface layer and the dynamic implementation layer is called internally by the SDK. In some embodiments, the implementation modes and methods are changed without affecting SDK integrated external programs as long as the preconditions of the interface protocol of the SDK integrated external programs are satisfied. Then, the package made from the interface protocol is integrated into a wireless application, which is compiled and published (i.e., made available publically). The published wireless application is installed and used by wireless clients. Also, the package made from the interface implementation is installed onto a server. After a wireless client installs or uses the wireless application, the SDK integrated into the wireless application autonomously acquires new versions of interface implementation data packages from the server. In this way, an SDK integrated program can obtain a new SDK upgrade package without the SDK integrated program having to be upgraded. The integrated SDK includes the permanent interface layer and does not include the dynamic implementation layer.

As an example of a precondition, assuming that a permanent interface layer only provides an interface for obtaining text type ads, then if an external program desires a text type ad, a change in the dynamic implementation layer including a new ad provider will not affect the external program. On the other hand, if the permanent interface layer adds new support for an image type ad, and an external program desires to obtain the image type ad, then an upgrade is to be performed because the permanent interface layer no longer satisfies the precondition.

In some embodiments, an SDK is divided by wireless application development personnel at the time of integration. In some embodiments, a third party provides the divided SDK. While performing integration, the wireless application development personnel only integrates the permanent interface layer of the divided SDK directly in an application.

In 220, the server integrates the SDK permanent interface layer into a wireless application and publishes the integrated wireless application. In some embodiments, the integrated wireless application is downloaded and used by wireless clients. At the same time, the SDK dynamic implementation layer is installed on the server.

In 230, the server determines whether an acquisition request sent by the wireless client using the wireless application has been received. In the event that the acquisition request sent by the wireless client using the wireless application has been received, control proceeds to operation 240. In the event that the acquisition request sent by the wireless client using the wireless application has not been received, control proceeds to operation 250.

The acquisition request requests that the interface implementation of the dynamic implementation layer be acquired from the server.

In the event that the server receives an acquisition request, receiving the request means that the published wireless application has not integrated the data of the dynamic implementation layer. At this point, the data of the dynamic implementation layer is acquired from the server in order to implement the dynamic implementation interface loading and updating. In the event that the server has not received an acquisition request, not receiving the request means that the published wireless application is integrated with the original version of the dynamic implementation layer. Generally, the original version refers to the original version packaged in the application during the publishing stage, and the original version usually is the newest version published at that time. In some embodiments, wireless clients automatically load interface implementations of original dynamic implementation layers from downloaded wireless applications. At the necessary times or preset times, acquisition requests are sent to the server to update interface implementations to update dynamic implementation layers.

In 240, in the event that the acquisition request sent by the wireless client using the wireless application has been received, the server sends the interface implementation of the dynamic implementation layer from the server to the wireless client. The interface implementation of the dynamic implementation layer causes the wireless application in the wireless client to invoke, through the interface defined by the interface protocol in the permanent interface layer, the interface implementation acquired from the server, and to dynamically load the class library for the interface implementation.

In some embodiments, the class library is introduced in the application development stage, and after compilation and packaging, the class library is published together with the wireless application. Such an approach is called static class library loading. In contrast, when a published wireless client application acquires a class library when running and dynamically loads and executes the corresponding logic, this approach is called dynamic class library loading.

In the operation 240, the class library for the interface implementation is dynamically loaded. In other words, while the wireless application is running, the class library for the interface implementation is acquired, and then the acquired class library is dynamically loaded and the corresponding logic is executed.

In 250, the server determines whether a query request sent by the wireless client has been received. In the event that the query request sent by the wireless client has been received, control proceeds to operation 260. In the event that the query request sent by the wireless client has not been received, control remains with operation 250.

The query request includes version information of the permanent interface layer and the dynamic implementation layer of the wireless application, and is used to query whether the server has an updated version of the permanent interface layer, the dynamic implementation layer, or a combination thereof.

In 260, the server confirms that an updated version of the permanent interface layer, the dynamic implementation layer, or a combination thereof exists and sends the updated version to the wireless client. The wireless client uses the updated version to update the permanent interface layer, the dynamic implementation layer, or a combination thereof of the wireless application of the wireless client.

Conventionally, a problem exists when the integrated SDK of a wireless application is being updated, the wireless application itself (in other words, the part other than the SDK) also needs to be updated at the same time. However, the above process 200 reduces the number of situations where the wireless application of the wireless client is required to be upgraded together with the updated SDK because the permanent interface layer is upgraded less than the dynamic implementation layer and the dynamic implementation layer itself is updated without the wireless application being updated. Also, the above process 200 is transparent to wireless application users and enhances the wireless application user's experience, reduces the development burden on wireless application developers, and lowers development and maintenance costs as well as the cost of publishing applications.

Figure 3:
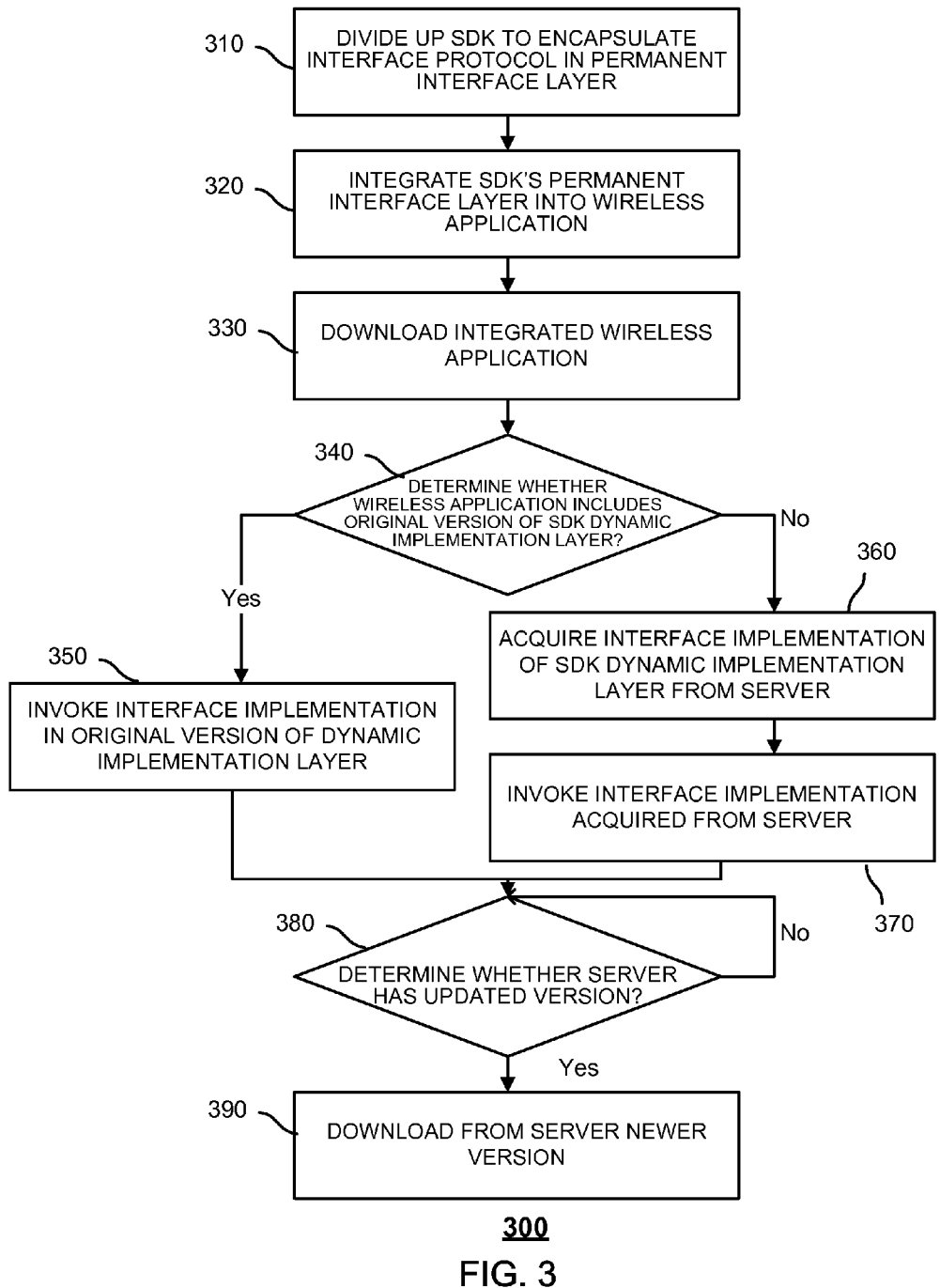
FIG. 3 is a flow chart of yet another embodiment of a wireless application publishing process.

FIG. 3 is a flow chart of yet another embodiment of a wireless application publishing process. The process 300 can be implemented by the server 820 of FIG. 8 and comprises:

In 310, the server divides up an SDK to encapsulate an interface protocol in a permanent interface layer and encapsulate an interface implementation in a dynamic implementation layer.

In some embodiments, the SDK is divided based on a reflection mechanism. The reflection mechanism in Java refers to classes that can be inspected during runtime without knowing the names of the classes during compilation. For example, the reflection mechanism (also called a reflection technique) makes use of Java's reflect package. Reflection is a mechanism in .NET. In some embodiments, reflection causes a wireless application to obtain members of each type within .NET (including class, struct, delegate, interface, and enum). The reflection mechanism includes methods, attributes, events, constructors, etc. In some embodiments, the reflection mechanism obtains each member's name, qualifier, and parameter, etc. In the event a reflection exists, having a thorough knowledge of each type is possible. In the event that the wireless application of a wireless client obtains information on a constructor, the reflection mechanism can create an object directly, even if the type of this object was unknown during compilation of the wireless application.

In some embodiments, the reflection mechanism divides up the SDK simplifying implementation of separated SDKs and lowering the cost of implementing wireless application publication schemes.

In 320, the server integrates the SDK's permanent interface layer into the wireless application, publishes the integrated wireless application, and installs the SDK's dynamic implementation layer onto a server.

For example, the SDK's permanent interface layer is statically packaged into the wireless application through a static link during compilation.

In some embodiments, the wireless application is initially not integrated with the original version of the SDK dynamic implementation layer. In other words, the original version of the SDK dynamic implementation layer code is not linked into the wireless application during compilation.

In 330, a wireless client downloads the integrated wireless application and installs the wireless application, uses the wireless application or a combination thereof.

In 340, the wireless client determines whether the integrated wireless application includes the original version of the SDK dynamic implementation layer. In the event that the integrated wireless application includes the original version of the SDK dynamic implementation layer, control proceeds to operation 350. In the event that the integrated wireless application does not include the original version of the SDK dynamic implementation layer, control proceeds to operation 360.

For example, in one situation, a wireless application has not been integrated with an original version of an SDK dynamic implementation layer. In this situation, the wireless client downloads and acquires the original version of the SDK dynamic implementation layer from the server and then dynamically loads and invokes the wireless application. In another situation, an SDK includes the original version of the SDK dynamic implementation layer. In this situation, the wireless client directly loads and invokes this original version of the SDK dynamic implementation layer when the wireless application is running and then sends a request to the server querying whether a new version of the SDK dynamic implementation layer exists. In the event that a new version of the SDK dynamic implementation layer exists, the wireless client downloads the new version of the SDK dynamic implementation layer, and then invokes and loads the new version of the SDK dynamic implementation layer. In some embodiments, the downloaded version of the SDK dynamic implementation layer replaces the existing version of the SDK dynamic implementation layer. Another situation is while the wireless application is running, the wireless client sends a request to the server querying whether a new version of the SDK dynamic implementation layer exists. In the event that a new version of the SDK dynamic implementation layer exists, the wireless client downloads the new version of the SDK dynamic implementation layer, and then invokes and loads the new version of the SDK dynamic implementation layer. In the event that a new version does not exist, the wireless client finds the version of the SDK dynamic implementation layer (in other words, the original version of the dynamic implementation layer) based on the protocol (for example, based on the path and file name). For example, the original version of the dynamic implementation layer is stored in a specific directory, if successfully upgraded the new version of the dynamic implementation layer replaces the original version of the dynamic implementation layer in the specific directory.

In 350, the wireless application of the wireless client invokes, through the interface defined by the interface protocol in the permanent interface layer of the integrated SDK on the wireless client, the interface implementation in the original version of the dynamic implementation layer, and dynamically loads the class library for the interface implementation. Subsequently, control proceeds to operation 380.

In some embodiments, the class library for the interface implementation is dynamically loaded. In other words, while the wireless application is running, the wireless client acquires the class library for the interface implementation, and then the wireless client dynamically loads the class library and executes the corresponding logic.

In 360, in the event that the integrated wireless application does not include the original version of the SDK dynamic implementation layer, the wireless application of the wireless client acquires the interface implementation of the SDK dynamic implementation layer from the server.

In some embodiments, the wireless application initially is not integrated with the original version of the SDK dynamic implementation layer. Therefore, in 340, in the event that the wireless client confirms that the integrated wireless application does not include the original version of the SDK dynamic implementation layer, control proceeds to operation 360.

In 370, the wireless application of the wireless client invokes, through the interface defined by the interface protocol in the SDK permanent interface layer, the interface implementation acquired from the server, and dynamically loads the class library for the interface implementation.

In 380, the wireless application of the wireless client determines whether the server has an updated version of the permanent interface layer, the dynamic implementation layer, or any combination thereof. In the event that the server has the updated version of the permanent interface layer, the dynamic implementation layer, or any combination thereof, control proceeds to operation 390. In the event that the server does not have an updated version of the permanent interface layer, the dynamic implementation layer, or any combination thereof, control remains at operation 380.

During SDK initialization, the wireless client acquires the current version of a local SDK related data package. In some embodiments, the current version is a number, and the server sends back to the client the current version of the most recent SDK related data package currently on the server. In the event that the version on the server is more recent than the current version of the client SDK, in other words, the server is running a newer version, the wireless client updates the newer SDK from the server.

In 390, the wireless application of the wireless client downloads from the server the newer version of the SDK permanent interface layer, the dynamic implementation layer, or a combination thereof, and updates the SDK permanent interface layer, the dynamic implementation layer, or a combination thereof in the wireless client.

The wireless application publishing and SDK upgrading shall be further explained in a comparison with conventional wireless application publishing and SDK upgrading.

For example, assuming an advertising SDK provides an interface Adobject.displayAd( ) where an application invokes the interface to obtain ad content. The SDK's permanent interface layer will invoke this interface: AdObject. displayAd ( ) {uses a reflection mechanism to invoke a dynamic implementation layer's AdObjectImp. displayAd( )}, an original implementation provides an implementation: AdObjectImp.displayAd (print "ad1"), at this time, the application invoking AdObject.displayAd will print ad1; if, at this time, the dynamic implementation layer is updated with a new version: AdObjectImp.displayAd (print "ad2"), when the application invokes AdObject.displayAd ( ) the application invoking AdObject.displayAd( ) will print ad2. Therefore, AdObject.displayAd ( ) belongs to the permanent interface layer and will be linked to the application. All versions of AdObjectImp1.displayAd belong to the dynamic implementation layer, and will not be linked to the application, but AdObjectImp.displayAd is dynamically loaded and called when the permanent interface layer is executed.

Figure 4:
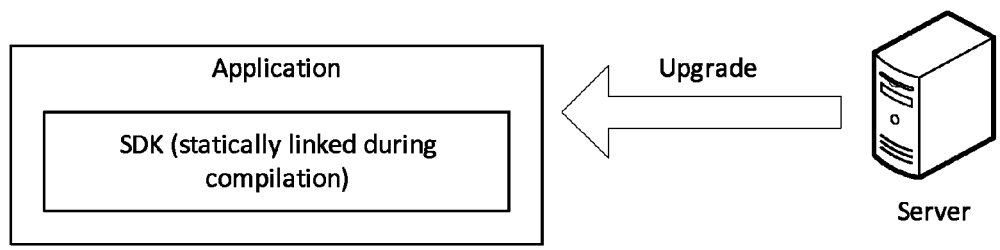
FIG. 4 is a diagram of a conventional wireless application publishing and SDK upgrading process.

FIG. 4 is a diagram of a conventional wireless application publishing and SDK upgrading process. Conventionally, in the wireless application field, SDK integration is achieved through static packaging into the application. Problems exist with conventional SDK integration such as a frequent desire to upgrade wireless application and a high upgrading cost. For whenever an SDK is to be upgraded, all applications integrated with the SDK have to be integrated, compiled, packaged, and distributed again, and client end users need to perform downloading and updating operations. Only after all the previous operations are performed can final SDK updating be achieved. In FIG. 4, the SDK in the application is statically linked in its entirety during compilation to the application and then the application is published. In other words, the entire SDK is integrated into the application and then the application with the integrate SDK is published. If the SDK in the application needs to be upgraded after a wireless client installs and uses the application, the whole application, including the application itself and the SDK integrated therein, is to be downloaded from a server. Subsequently, whenever a new SDK version is published, the wireless application developer should modify the code and republish, even though the wireless application itself may not be modified at all. The user's wireless application itself must also undergo updating. For wireless application developers, this process adds extra development and maintenance costs as well as application publishing costs. The process also detracts from the user's wireless application's user experience.

Figure 5:
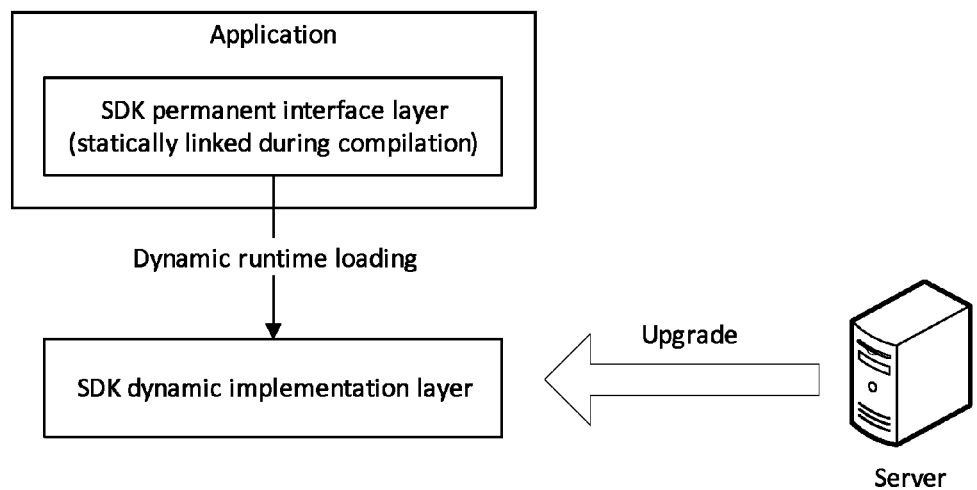
FIG. 5 is a diagram of an embodiment of a wireless application publishing and SDK upgrading process.

FIG. 5 is a diagram of an embodiment of a wireless application publishing and SDK upgrading process. FIG. 5 illustrates the separation of the SDK permanent interface layer and the dynamic implementation layer. The application is integrated with the SDK permanent interface layer only. In other words, the SDK permanent interface layer is statically linked to the application during compilation and is then published, and the SDK dynamic implementation layer is dynamically loaded into the application while the application is being executed. In the event that the SDK is to be upgraded, only the SDK dynamic implementation layer is modified. The application itself does not need to be altered. Thus, the wireless application is not required to update the wireless application itself and thus has the user has an improved experience. In addition, the wireless application developer is not required to perform additional development and maintenance of the application, thus lowering development and maintenance costs of the application as well as publishing costs of the application.

In some embodiments, a dynamic class library loading mechanism separates the SDK's permanent interface layer (which rarely changes) the SDK's dynamic implementation layer (which regularly requires updating). Only the permanent interface layer is linked and packaged in the wireless client application, and the dynamic implementation layer bundled during run-time through the loading and invoking of the dynamic class library, thus the number of situations where the wireless application of the wireless client must be upgraded together with the SDK is reduced. As long as the basic abstract interface layer (in other words, the SDK's permanent interface layer) does not change, the wireless application can be automatically upgraded during execution transparently to the user.

Figure 6:
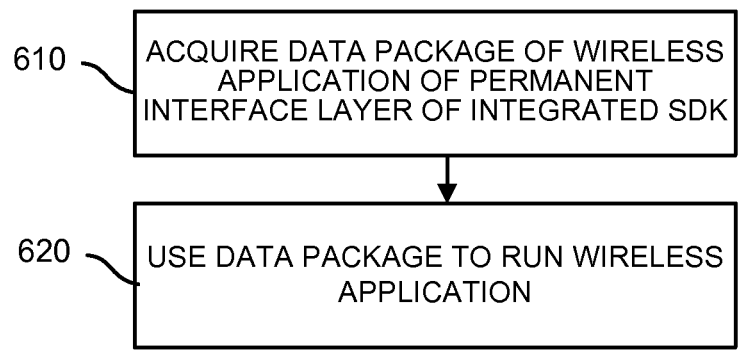
FIG. 6 is a flow chart of an embodiment of wireless application implementing process.

FIG. 6 is a flow chart of an embodiment of wireless application implementing process. The process 600 can be implemented by a client 810 of FIG. 8 and comprises:

In 610, the client acquires a data package of a wireless application integrated with a permanent interface layer of an integrated SDK.

The SDK includes the permanent interface layer and a dynamic implementation layer. The permanent interface layer includes an interface protocol invokable by a wireless application. The processes discloses in the present application are not restricted to wireless application and could be applied to other applications. The permanent interface layer is integrated in the wireless application. The dynamic implementation layer includes an interface implementation. The interface implementation corresponds to the interface protocol of the permanent interface layer and is invokable by the interface protocol. The dynamic interface layer is installed on a server. A division of the SDK includes encapsulating the interface protocol in the SDK as the permanent interface layer, and encapsulating the interface implementation in the SDK as the dynamic implementation layer. In some embodiments, the SDK is divided using a reflection mechanism.

In some embodiments, the wireless client first acquires a data package of a wireless application integrated with permanent interface layer of the SDK.

In 620, the client uses the data package to run the wireless application.

In some embodiments, the wireless client, depending on the situation, uses the data package to run the wireless application.

For example, in the event that a wireless application is also integrated with the original version of the dynamic implementation layer, the wireless application uses the interface defined by the interface protocol in the permanent interface layer to invoke the interface implementation in the original version of the dynamic implementation layer, and the wireless application dynamically loads the class library for the interface implementation. In the event that the original version of the dynamic implementation layer is not integrated in the wireless application, the wireless application sends an acquisition request to a server. The acquisition request requests an acquisition of the interface implementation of the dynamic implementation layer from the server. After the server sends the interface implementation of the dynamic implementation layer to the client, the wireless application receives the interface implementation of the dynamic implementation layer sent by the server. In addition, the wireless application uses the interface defined by the interface protocol in the permanent interface layer to invoke the interface implementation acquired from the server, and dynamically loads the class library for the interface implementation.

In some embodiments, after the data package of the wireless application is used to execute the wireless application, in other words, after the class library for the interface implementation is dynamically loaded, the wireless application sends a query request to the server. The query request queries whether an updated version of the permanent interface layer, the dynamic implementation layer, or a combination thereof is present on the server. In the event that the updated version is present on the server, the wireless client receives the updated version of the permanent interface layer, the dynamic implementation layer, or a combination thereof sent back by the server is received and the updated version of the permanent interface layer, the dynamic implementation layer, or a combination thereof is updated.

In some embodiments, the wireless client with the wireless application that has been integrated with an SDK does not need to update the wireless application itself (in other words, the part other than the SDK). Instead, the wireless client simply updates the SDK integrated in the wireless application. This update process reduces the number of situations where the wireless application of the wireless client must be upgraded together with the SDK and enhances the user experience of wireless application users.

Please note that the wireless application implementing process corresponds to the wireless application publishing process in at least one of the above process. Accordingly, details of the at least one of the above process are omitted for conciseness.

Figure 7:
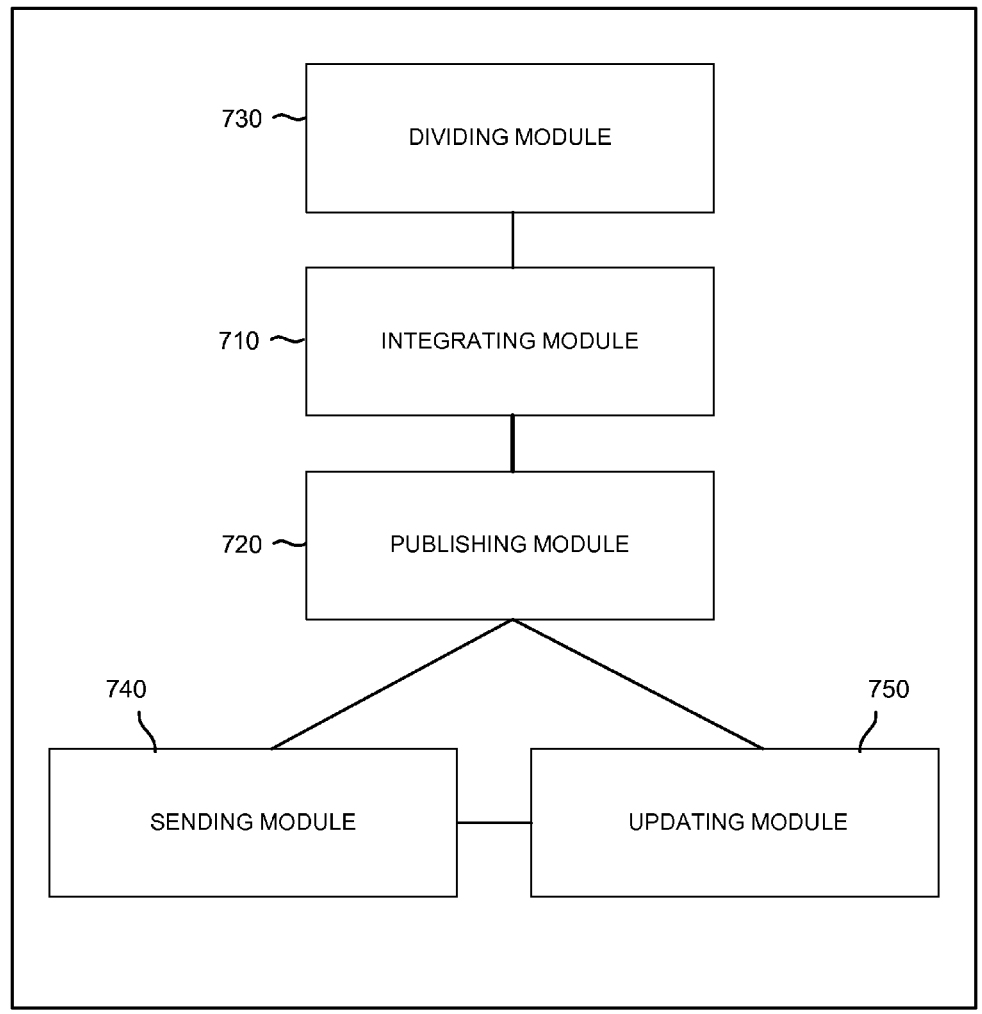
FIG. 7 is a structural block diagram of an embodiment of a wireless application publishing device.

FIG. 7 is a structural block diagram of an embodiment of a wireless application publishing device. The device 700 can be implemented in the server 820 of FIG. 8. The device 700 includes an integrating module 710, a publishing module 720, and an updating module 750.

The integrating module 710 integrates a permanent interface layer of an SDK into a wireless application. The SDK includes the permanent interface layer and a dynamic implementation layer. The permanent interface layer includes an interface protocol to be invoked by the wireless application, and the dynamic implementation layer includes an interface implementation. The interface implementation of the dynamic implementation layer corresponds to the interface protocol of the permanent interface layer. The interface protocol in the permanent interface layer causes the wireless application in the wireless client to invoke the interface implementation in the dynamic implementation layer.

The publishing module 720 publishes the integrated wireless application and installs the dynamic implementation layer of the SDK onto a server. After the wireless application is published, the wireless client can download and use the published wireless application using the interface defined by the interface protocol in the permanent interface layer to invoke the interface implementation of the dynamic implementation layer.

In some embodiments, the wireless application publishing device 700 further comprises a dividing module 730. The dividing module 730 divides the SDK before the integrating module 710 integrates the permanent interface layer of the SDK into the wireless application and encapsulates the interface protocol in the SDK as the permanent interface layer and encapsulates the interface implementation in the SDK as the dynamic implementation layer. In some embodiments, the SDK is divided by a reflection mechanism.

In some embodiments, the wireless application publishing device 700 further comprises a sending module 740. The sending module 740 acquires, after the publishing module 720 publishes the integrated wireless application and installs the dynamic implementation layer of the SDK onto the server, an acquisition request sent using a wireless client of the wireless application. The acquisition request is used for requesting from the server the acquisition of the interface implementation of the dynamic implementation layer. The acquisition request is used as a basis for sending the interface implementation of the dynamic implementation layer from the server to the wireless client, and the interface protocol in the permanent interface layer causes the wireless application in the wireless client to invoke the interface implementation acquired from the server, and dynamically load the class library for the interface implementation. In some embodiments, the wireless application in the wireless client is invoked through the interface defined by the interface protocol in the permanent interface layer.

In some embodiments, the integrating module 710 also integrates, at a time different from the integration of the permanent interface layer of the SDK into the wireless application, the original version of the dynamic implementation layer into the wireless application. In some embodiments, the integrating module 710 integrates, at a time before the integration of the permanent interface layer of the SDK into the wireless application, the original version of the dynamic implementation layer into the wireless application. In some embodiments, the integrating module 710 integrates, at a time after the integration of the permanent interface layer of the SDK into the wireless application, the original version of the dynamic implementation layer into the wireless application. The publishing module 720 publishes the integrated wireless application that has integrated the original version of the SDK permanent interface layer and the original version of the dynamic implementation layer making the wireless application available for download. The publishing module 720 causes the wireless application of the wireless client to invoke, through the interface defined by the interface protocol in the permanent interface layer, the interface implementation in the original version of the dynamic implementation layer, dynamically load the class library for the interface implementation, and install the dynamic implementation layer of the SDK on the server. The publishing module 720 makes the integrated wireless application available to wireless clients for downloading and use.

In some embodiments, the publishing module 720 also receives, after the sending module 740 has caused the server to send the interface implementation of the dynamic implementation layer to the wireless client, a query request sent by the wireless client. The query request is used for querying whether the server has an updated version of the permanent interface layer, the dynamic implementation layer or a combination thereof, confirms that the server has an updated version of the permanent interface layer, the dynamic implementation layer, or a combination thereof, and sends the updated version the permanent interface layer, the dynamic implementation layer, or a combination thereof from the server to the wireless client. The updated version is used by the wireless client to update the permanent interface layer, the dynamic implementation layer, or a combination of the wireless application of the wireless client.

The updating module 750 receives, after the publishing module 720 publishes the wireless application integrated with the original version of the SDK permanent interface layer and a dynamic implementation layer and makes the wireless application available to wireless clients for downloading and use, the query request sent by the wireless client, confirms that the server has an updated version of the permanent interface layer, the dynamic implementation layer, or a combination thereof, and sends the updated version of the permanent interface layer, the dynamic implementation layer, or a combination thereof from the server to the wireless client so that the wireless client updates the permanent interface layer, the dynamic implementation layer, or a combination thereof of the wireless application of the wireless client.

In some embodiments, the wireless application publishing device 700 is installed on a server.

The wireless application publishing device 700 is used to implement at least one of the above corresponding wireless application publishing processes. Moreover, the wireless application publishing device 700 has the benefits of the above corresponding processes. Details of the above processes are omitted for conciseness.

Figure 8:
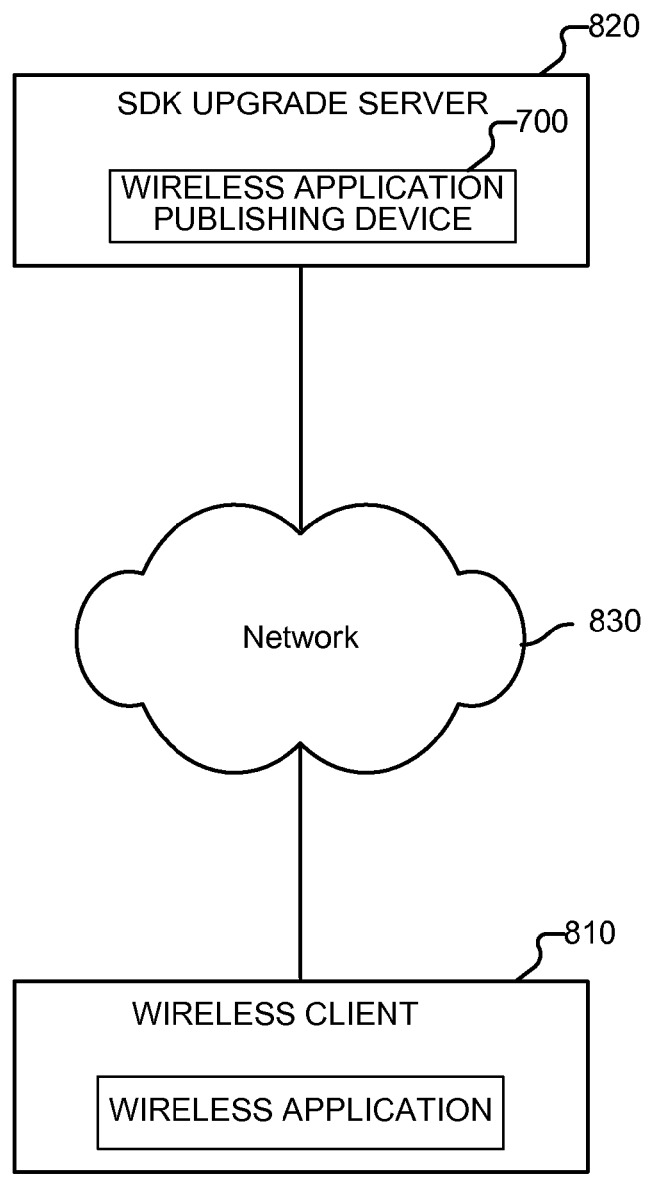
FIG. 8 is a structural block diagram of an embodiment of a wireless application publishing system.

FIG. 8 is a structural block diagram of an embodiment of a wireless application publishing system. The system 800 includes a wireless client 810 and an SDK upgrade server 820. The wireless client 810 is connected to the SDK upgrade server 820 via a network 830.

The SDK upgrade server 820 includes a wireless application publishing device. For example, the server 820 includes the wireless application publishing device 700 of FIG. 7.

Figure 9:
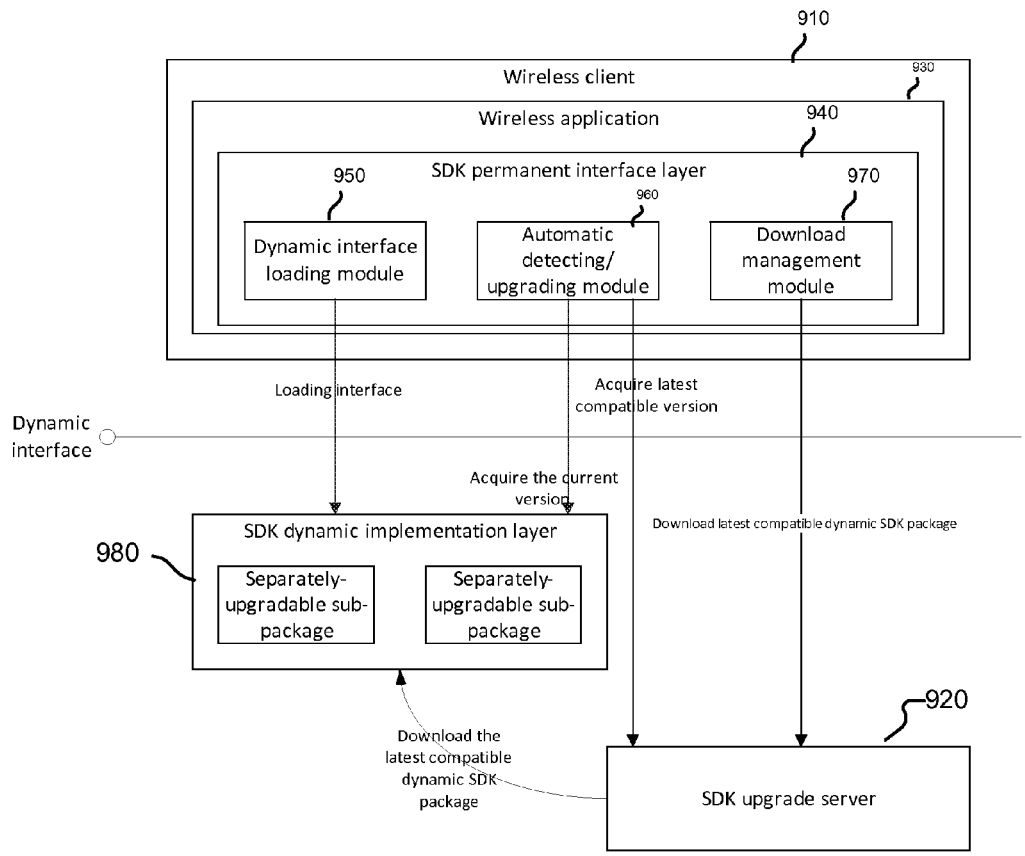
FIG. 9 is a diagram of an SDK being upgraded using the wireless application publishing system.

FIG. 9 is a diagram of an SDK being upgraded using the wireless application publishing system. The system 900 includes a wireless client 910 and an SDK upgrade server 920. The wireless client 910 corresponds to the wireless client 810 of FIG. 8. The SDK upgrade server 920 corresponds to the SDK upgrade server 820 of FIG. 8.

In some embodiments, in the event that the SDK upgrade server 920 integrates an SDK permanent interface layer 940 into a wireless application 930 loaded onto a wireless client 910, the SDK permanent interface layer 940 includes a dynamic interface loading module 950, an automatic detecting/upgrading module 960, and a download management module 970. The dynamic interface loading module 950 dynamically loads the class library for the dynamic implementation layer during the execution of the wireless application in order to complete the functions provided by the SDK or the wireless application. The automatic detecting/upgrading module 960 compares, during SDK initialization, the current version of the permanent interface layer and the latest version of the dynamic implementation layer version on the SDK upgrade server 920 and determines whether to perform a runtime update operation. In the event that the runtime update operation is to be performed, the download management module 970 downloads a data package of the latest version of the permanent interface layer, the dynamic implementation layer, or a combination thereof from the SDK upgrade server 820 and performs the upgrade.

The wireless client 910 downloads the integrated wireless application from the SDK upgrade server 920 and installs and uses the integrated wireless application 930. In some embodiments, the wireless client 910, during the installation of the wireless application or the execution, uses the dynamic interface loading module 950 in the SDK permanent interface layer 940 in the wireless application to acquire the interface implementation of the SDK dynamic implementation layer 980 from the SDK upgrade server 920 and dynamically loads and invokes the class library for the interface implementation. Then, the wireless client 910 can use the automatic detecting/upgrading module 960 for periodic or occasional queries to the SDK upgrade server 920 querying whether the wireless client 910 has the corresponding updated version. In the event that the wireless client 910 has the corresponding updated version, then the wireless client 910 downloads the corresponding updated version from the SDK upgrade server 920 using the download management module 970 to update SDK permanent interface layer, the dynamic implementation layer or a combination thereof of the wireless client 910.

In some embodiments, the SDK dynamic implementation layer 980 is installed on the SDK upgrade server 920 to update the interface implementation. In addition, the SDK upgrade server 920 also updates the SDK permanent interface layer 940. Please note that, for simplicity, the SDK dynamic implementation layer 980 is illustrated by itself. In some embodiments, the upgrade of the SDK dynamic implementation layer 980 utilizes a separate server. In some embodiments, the upgrade of the SDK dynamic implementation layer 980 is also installed on a server that is responsible for updating the SDK permanent interface layer 940, in other words, one server updates a plurality of functional units.

The wireless application 930 that has an integrated SDK permanent interface layer 940 is installed on the wireless client 910. During the execution of the web application 930, the web application 930 dynamically loads the class library for the dynamic implementation layer 980 using the dynamic interface loading module 950 and thereby completes the functions that the SDK or the application provides, such as loading advertisements. The wireless application 930 queries the SDK upgrade server 920 periodically or occasionally using the automatic detecting/upgrading module 960 to determine whether the SDK upgrade server 920 has updates to the SDK dynamic implementation layer 980, the permanent interface layer 940, or a combination thereof. During SDK initialization, the automatic detecting/upgrading module 960 compares the current version of the SDK dynamic implementation layer 980, the permanent interface layer 940, or a combination thereof to the latest version on the SDK upgrade server 920 and determines whether to perform an updating operation. In some embodiments, during SDK initialization, the automatic detecting/upgrading module 960 acquires the current version number of a data package of the local SDK dynamic implementation layer. Typically, the current version number of the data package of the local SDK dynamic implementation layer is a number. The server sends back to the client the latest version of the data package of the SDK dynamic implementation layer currently on the server. In the event that the server's version number does not match the current version number of the client SDK, which means a new version exists and updating can be performed. In addition, although the SDK permanent interface layer 940 is relatively stable, the SDK permanent interface layer 940 is capable of being upgraded. Therefore, the version of the permanent interface layer is used as a basis for determining whether the corresponding dynamic class library version from the SDK upgrade server 920 is downloaded. The SDK upgrade server 920 responds to the request from the wireless client 910 inquiring about the latest version, and the SDK upgrade server 920 sends back the latest version number and the download address of the package for the corresponding version. Then, the download management module 970 downloads the most recently updated dynamic class library implementation package (including the data package of the permanent interface layer and the data package of the dynamic implementation layer data package) from the SDK upgrade server 920 and carries out the update.

The system 900 described uses self-advertising SDKs and third party advertising SDKs and only publishes SDKs that contain logic oriented towards relatively permanent interface implementation advertising, permitting wireless application developers to configure on the servers the advertising SDKs that are integrated with their wireless applications. Thus, in the event that a wireless application is running, the wireless client dynamically acquires the latest version of the SDK integrated class library from the server and loads and executes the latest version of the SDK integrated class library. Accordingly, the need for frequent updating after integrating an advertising SDK with a wireless application is eliminated.

The system 900 is not only useful in wireless advertising SDK upgrading, but also suitable for updating and upgrading alliance type SDKs which consolidate a plurality of advertising SDKs for the purpose of optimizing wireless client advertising. In the event that a wireless application itself uses the SDK, the wireless application is also used for updating the wireless application itself and for function upgrading.

The system 900 includes the following benefits:

(1) The wireless application acquires new capabilities to acquire and place advertisements without having to be updated.

(2) The wireless application is integrated with a new advertising SDK and also updates the version of an already integrated SDK, both without having to update the wireless application.

(3) Through a configuration on the server, the ratio of client integrated wireless advertising SDKs to advertising is capable of being changed in an increasing or decreasing manner.

(4) The wireless application itself also employs this solution to achieve runtime downloading of class libraries and updating of application functions. Thus, reducing downloads, installations, and other such operations when the user updates the wireless application.

Figure 10:
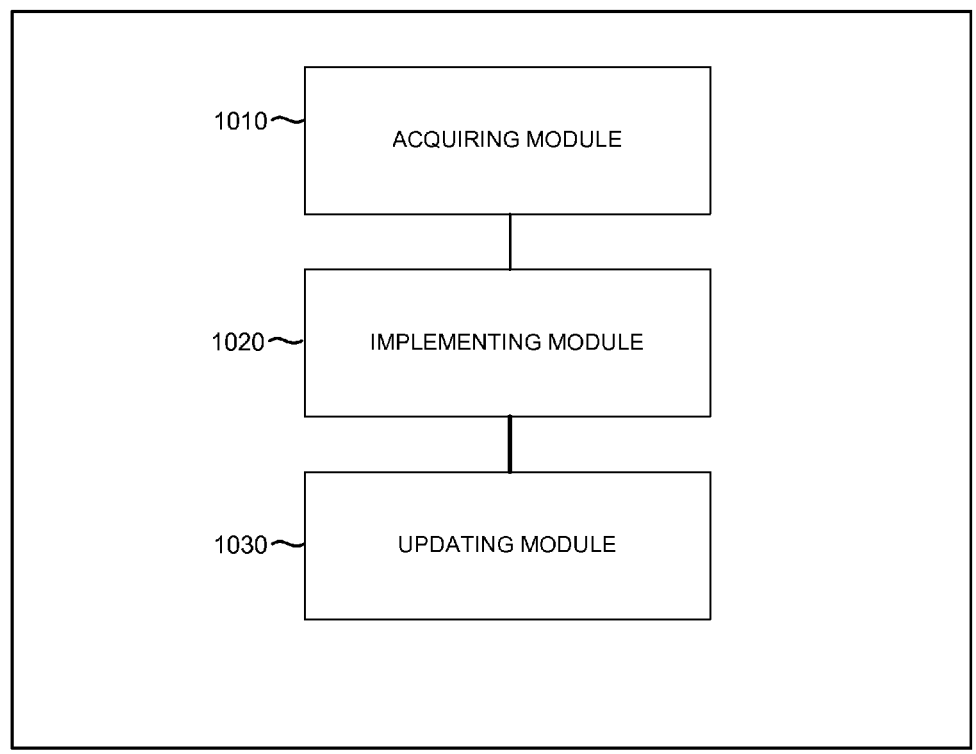
FIG. 10 is a structural block diagram of an embodiment of a wireless application implementing device.

FIG. 10 is a structural block diagram of an embodiment of a wireless application implementing device. The device 1000 includes an acquiring module 1010 and an implementing module 1020. The wireless application implementing device 1000 can be installed on the wireless client 810 of FIG. 8.

The acquiring module 1010 acquires a data package of a wireless application integrated with an SDK permanent interface layer. The implementing module 1020 uses the data package of the wireless application to run the wireless application. The SDK includes the permanent interface layer and a dynamic implementation layer. The permanent interface layer is integrated in the wireless application and includes an interface protocol to be invoked by the wireless application. The dynamic implementation layer is installed on the server and includes an interface implementation corresponding to the interface protocol.

In some embodiments, the implementing module 1020 sends an acquisition request to the server. The acquisition request requests acquisition of the interface implementation of the dynamic implementation layer from the server. The wireless application receives the interface implementation of the dynamic implementation layer sent back by the server, and the wireless application uses the interface defined by the interface protocol in the permanent interface layer to invoke the interface implementation acquired from the server. The wireless application dynamically loads the class library for the interface implementation.

In some embodiments, the wireless application is also integrated with the original version of the dynamic implementation layer. In this case, the implementing module 1020 also uses the interface defined by the interface protocol in the permanent interface layer to invoke the interface implementation in the original version of the dynamic implementation layer and dynamically loads the class library for the interface implementation.

In some embodiments, the wireless application implementing device 1000 further comprises an updating module 1030. The updating module 1030 sends, after the implementing module 1020 dynamically loads the class library for the interface implementation, a query request to the server. The query request queries whether the server has an updated version of the permanent interface layer, the dynamic implementation layer, or a combination thereof, receives the updated version of the permanent interface layer, the dynamic implementation layer, or a combination thereof sent back by the server, and uses the updated version to update the permanent interface layer, the dynamic implementation layer, or a combination thereof of the wireless application.

The wireless application device implements at least one of the above wireless application implementing processes and has the beneficial results of the wireless application implementing processes.

The present application abstracts SDKs and only publishes SDKs that contain orientations towards relatively permanent interfaces, permitting wireless application developers to configure and update SDKs on servers that are frequently updated. Thus, when a wireless application is running, the wireless application uses this configuration as a basis for dynamically acquiring the latest version of the SDK integrated class library from the server and loads and executes the latest version. By dynamically loading class libraries, those wireless applications that are currently integrated with SDKs obtain new functions. The present application is suitable for wireless application publishing and upgrading for many kinds of operating platforms including Java developed wireless applications running on Android platforms. Examples include developing games with integrated game engine packages or compiling program distribution and use statistics with an integrated visit counting and user tracking package. However, the present application is not limited to the above examples. Wireless application publishing and upgrading solutions of the present application may apply to other types of situations, for example, wireless applications developed with C.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of publishing a wireless application, comprising:
   providing a software development kit (SDK) that encapsulates an interface protocol as a permanent interface layer and that encapsulates an interface implementation as a dynamic implementation layer, wherein the interface protocol includes method names, return types, accepted parameters, input-output protocols, or any combination thereof;
   after the providing of the SDK, integrating the permanent interface layer of the SDK into a wireless application, wherein the SDK includes the permanent interface layer and the dynamic implementation layer, the permanent interface layer including the interface protocol to be invoked by the wireless application and the dynamic implementation layer including the interface implementation corresponding to the interface protocol;
   publishing the integrated wireless application; and
   installing the dynamic implementation layer of the SDK onto a server.

2. The method as described in claim 1, wherein the providing of the SDK is implemented through a reflection mechanism.

3. The method as described in claim 1, further comprising:
   after the publishing of the integrated wireless application and the installing of the dynamic implementation layer of the SDK onto the server:
      receiving an acquisition request sent by a wireless client using the wireless application, the acquisition request being used to request from the server an acquisition of the interface implementation of the dynamic implementation layer;
      in response to the acquisition request, sending the wireless client the interface implementation of the dynamic implementation layer, an interface defined by the interface protocol in the permanent interface layer being used by the wireless application in the wireless client to invoke the interface implementation acquired from the server; and
      dynamically loading a class library for the interface implementation.

4. The method as described in claim 3, further comprising:
   after the sending to the wireless client of the interface implementation of the dynamic implementation layer:
      receiving a query request sent by the wireless client, the query request being for querying whether the server has an updated version of the permanent interface layer, the dynamic implementation layer, or a combination thereof; and
      in the event that the server has an updated version of the permanent interface layer, the dynamic implementation layer, or a combination thereof, sending the updated version from the server to the wireless client, the updated version being used by the wireless client to update the permanent interface layer, the dynamic implementation layer, or a combination of the wireless application of the wireless client.

5. The method as described in claim 1, further comprising:
   at a time different from the integrating of the permanent interface layer of the SDK into the wireless application, integrating the original version of the dynamic implementation layer into the wireless application;
   wherein the publishing of the integrated wireless application comprising:
      publishing the wireless application integrated with the original versions of the SDK permanent interface layer and the dynamic implementation layer and making the wireless application available for downloading by the wireless client, the interface being used by the wireless application of the wireless client to invoke the interface implementation in the original version of the dynamic implementation layer through an interface defined by the interface protocol in the permanent interface layer; and
      dynamically loading the class library for the interface implementation.

6. The method as described in claim 5, further comprising:
   after the publishing of the wireless application integrated with the original versions of the SDK permanent interface layer and the dynamic implementation layer and the making of the wireless application available for downloading by the wireless client:
      receiving a query request sent by the wireless client, the query request being for querying whether the server has an updated version of the permanent interface layer, the dynamic implementation layer, or a combination thereof; and
      in the event that the server has an updated version of the permanent interface layer, the dynamic implementation layer, or a combination thereof, sending the updated version from the server to the wireless client, the updated version being used by the wireless client to update the permanent interface layer, the dynamic implementation layer of its wireless application, or a combination thereof.

7. The method as described in claim 1, wherein:
   the providing of the SDK is implemented through a reflection mechanism;
   the interface protocol includes an object based display ad function; and
   the interface implementation includes an object implementation based display ad function.

8. A wireless application publishing device, comprising:
   at least one processor configured to:
      provide a software development kit (SDK) that encapsulates an interface protocol as a permanent interface layer and that encapsulates an interface implementation as a dynamic implementation layer, wherein the interface protocol includes method names, return types, accepted parameters, input-output protocols, or any combination thereof;
after the providing of the SDK, integrate the permanent interface layer of the SDK into a wireless application, wherein the SDK includes the permanent interface layer and the dynamic implementation layer, the permanent interface layer including the interface protocol to be invoked by the wireless application and the dynamic implementation layer including the interface implementation corresponding to the interface protocol;
publish the integrated wireless application; and
installing the dynamic implementation layer of the SDK onto a server; and
a memory coupled to the at least one processor and configured to provide the at least one processor with instructions.

9. A computer program product for controlling float-out messages, the computer program product being embodied in a non-transitory computer readable storage medium and comprising computer instructions for:
providing a software development kit (SDK) that encapsulates an interface protocol as a permanent interface layer and that encapsulates an interface implementation as a dynamic implementation layer, wherein the interface protocol includes method names, return types, accepted parameters, input-output protocols, or any combination thereof;
after the providing of the SDK, integrating the permanent interface layer of the SDK into a wireless application, wherein the SDK includes the permanent interface layer and the dynamic implementation layer, the permanent interface layer including the interface protocol to be invoked by the wireless application and the dynamic implementation layer including the interface implementation corresponding to the interface protocol;
publishing the integrated wireless application; and
installing the dynamic implementation layer of the SDK onto a server.

* * * * *